(12) United States Patent
Doering et al.

(10) Patent No.: US 11,345,326 B2
(45) Date of Patent: May 31, 2022

(54) METHODS AND SYSTEM FOR STARTING AN INTERNAL COMBUSTION ENGINE

(71) Applicant: Ford Global Technologies, LLC, Dearborn, MI (US)

(72) Inventors: Jeffrey Allen Doering, Canton, MI (US); Kevin Ray Ruybal, Canton, MI (US); Jason Meyer, Canton, MI (US); Mark Steven Yamazaki, Canton, MI (US); Rajit Johri, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/829,291

(22) Filed: Mar. 25, 2020

(65) Prior Publication Data

US 2021/0300316 A1    Sep. 30, 2021

(51) Int. Cl.
| B60W 10/06 | (2006.01) |
| B60W 10/08 | (2006.01) |
| B60W 30/192 | (2012.01) |
| B60W 10/02 | (2006.01) |
| B60K 6/387 | (2007.10) |
| B60W 20/10 | (2016.01) |
| B60W 20/40 | (2016.01) |
| B60W 30/188 | (2012.01) |

(52) U.S. Cl.
CPC .............. *B60W 10/06* (2013.01); *B60K 6/387* (2013.01); *B60W 10/02* (2013.01); *B60W 10/08* (2013.01); *B60W 20/10* (2013.01); *B60W 20/40* (2013.01); *B60W 30/192* (2013.01); *B60L 2240/423* (2013.01); *B60W 30/1882* (2013.01); *B60W 2540/10* (2013.01); *B60W 2710/021* (2013.01); *B60W 2710/0666* (2013.01)

(58) Field of Classification Search
CPC ....... B60W 20/40; B60W 10/08; B60W 20/10
See application file for complete search history.

(56) References Cited

U.S. PATENT DOCUMENTS

| 7,090,613 | B2 | 8/2006 | Heap et al. |
| 7,264,570 | B2 | 9/2007 | Heap et al. |
| 7,278,388 | B2 | 10/2007 | Lewis et al. |
| 8,924,061 | B2 | 12/2014 | Reed et al. |
| 10,399,557 | B2 | 9/2019 | Johri et al. |
| 2007/0006831 | A1 | 1/2007 | Leone et al. |
| 2007/0209618 | A1 | 9/2007 | Leone |
| 2009/0183706 | A1 | 7/2009 | Miwa et al. |
| 2012/0130579 | A1* | 5/2012 | Steuernagel ...... B60W 50/0097 701/22 |
| 2012/0292919 | A1 | 11/2012 | Suzuki |
| 2014/0142795 | A1* | 5/2014 | Akebono ............... B60K 6/547 701/22 |
| 2014/0244140 | A1* | 8/2014 | Yoshihara ............... F02D 29/02 701/112 |

(Continued)

*Primary Examiner* — Stacey A Fluhart
(74) *Attorney, Agent, or Firm* — David Kelley; McCoy Russell LLP (57) ABSTRACT

A method for operating a vehicle that may be automatically stopped and started is described. In one example, the method includes starting an engine via expansion stroke combustion in response to a request to urgently start the engine. In addition, the method includes adjusting a position of a compression relief valve in response to a predicted urgency of an engine start.

11 Claims, 5 Drawing Sheets

(56) References Cited

U.S. PATENT DOCUMENTS

| | | | |
|---|---|---|---|
| 2014/0251267 A1* | 9/2014 | Hashemi | F02N 19/004 |
| | | | 123/345 |
| 2014/0373676 A1* | 12/2014 | Nefcy | F02N 15/022 |
| | | | 74/7 C |
| 2019/0040831 A1* | 2/2019 | Yamamoto | F02N 11/087 |

* cited by examiner

METHODS AND SYSTEM FOR STARTING AN INTERNAL COMBUSTION ENGINE

FIELD

The present description relates to methods and a system for starting an internal combustion engine. The methods and systems provide for a dynamically changing torque reserve for an electric machine used to start the internal combustion engine.

BACKGROUND AND SUMMARY

A vehicle may include an internal combustion engine and one or more electric machines that may provide torque to a driveline. The one or more electric machines may be configured to provide propulsive effort to propel the vehicle. In addition, the one or more electric machines may be requested to start the engine from time to time after the engine has been automatically stopped or stopped via a specific request that is made via a human driver. Since the one or more electric machines have limited output torque capacity, it may be desirable to provide a way of managing electric machine torque to ensure that the electric machine has torque capacity to start the engine when the engine is in a stopped state.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
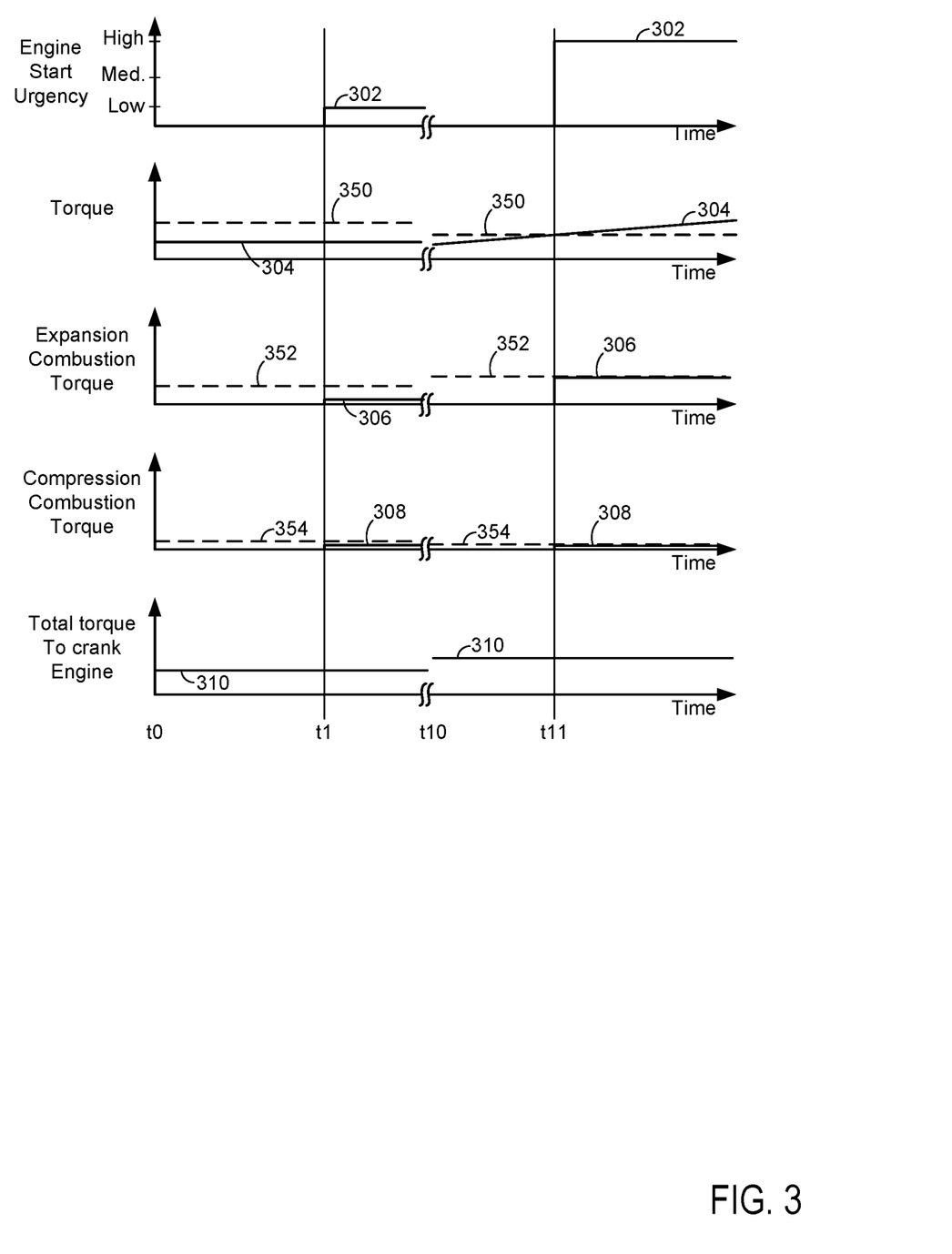
FIG. 3 shows an example vehicle operating sequence according to the methods of FIGS. 4 and 5.
Figure 4:
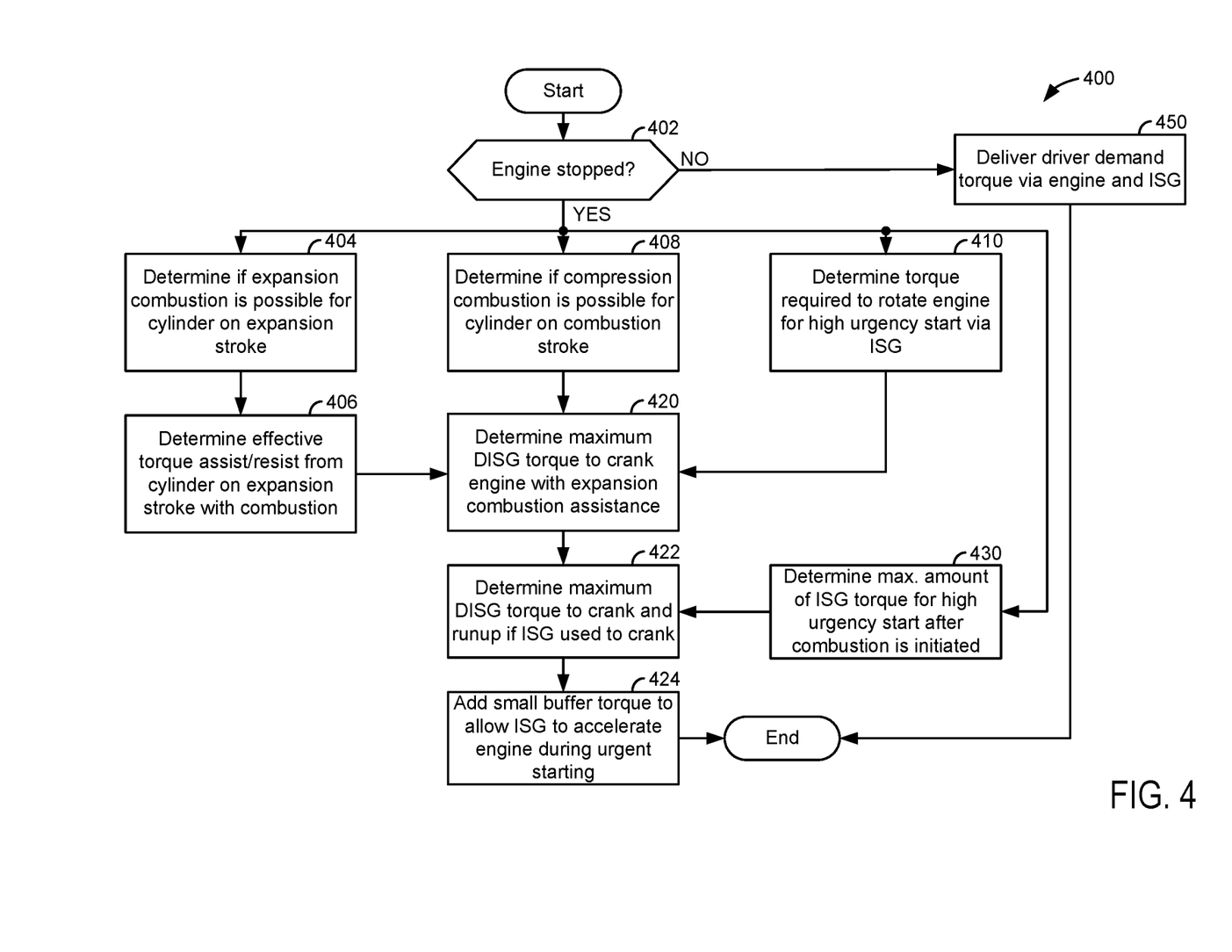
FIG. 4 shows a flowchart of an example method for determining a torque reserve for engine starting.
Figure 5:
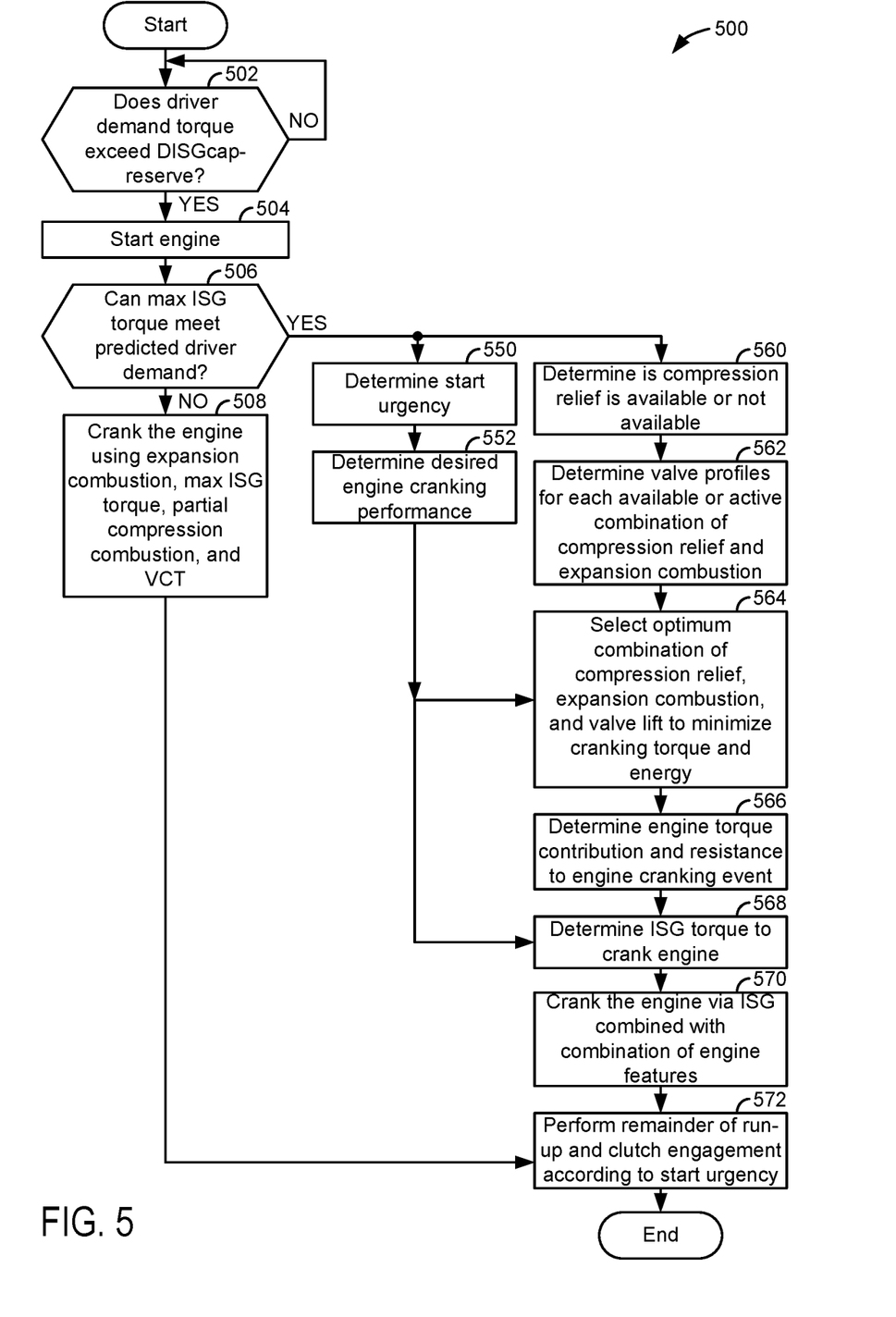
FIG. 5 shows a flowchart of an example method for starting an engine.

The present description is related to starting an internal combustion engine via an electric machine. The engine may be automatically started according to an urgency level for the engine start that is determined from vehicle operating conditions. For low urgency engine starts, the engine may be started such that the energy to start the engine may be reduced as compared to engine starts that are determined to be of medium or high urgency. For high urgency engine starts, maximum torque capacity of the electric machine and of the engine may be requested so that driver demand torque may be met in a timely manner. The engine and driveline may be of the type shown in FIGS. 1 and 2. The driveline may be operated according to the methods of FIGS. 4 and 5 as shown in the sequence of FIG. 3 to provide the driver demand torque while meeting an engine starting urgency level. A method for generating a dynamically changing electric machine torque reserve for determining when to start an engine is shown in FIG. 4. A method for applying the dynamically changing electric machine torque reserve to start an engine is shown in FIG. 5.

A vehicle may include an internal combustion engine and one or more electric machines that may provide torque to a driveline. One of the electric machines may be a driveline integrated starter/generator (ISG) that may be selectively coupled to the engine via a driveline disconnect clutch. The ISG may provide torque to the driveline to accelerate the vehicle. Alternatively, the ISG may be operated as a generator to charge the vehicle's battery using power that is provided via the engine or the vehicle's inertia. The ISG may also provide torque to the engine when the engine is being started via at least partially closing the driveline disconnect clutch. If the ISG is used to start the engine and ISG torque output is already near the torque capacity of the ISG, then the amount of torque used to propel the vehicle may be reduced when the engine is being restarted. The reduction in propulsion torque may be noticeable and objectionable to vehicle occupants. Conversely, if engine starting via the ISG is requested such that only a small amount of the ISG's torque capacity is utilized to start the engine and propel the vehicle, then vehicle efficiency may be reduced.

The inventors herein have recognized the above-mentioned issues and have developed a method for operating a vehicle, comprising: dynamically adjusting a torque reserve of an electric machine for engine starting according to an engine stopping position and an expected amount of reduction in required cranking torque due to the torque and work generated from combustion in cylinders initially positioned on expansion and compression strokes in an engine; and starting the engine via the electric machine in response to driver demand torque being greater than or equal to an available torque of the electric machine minus the torque reserve of the electric machine.

By dynamically adjusting a torque reserve of an electric machine that may be applied to start the engine, it may be possible to utilize a greater portion of an available amount of electric machine torque, thereby improving vehicle energy efficiency. In addition, dynamically adjusting the electric machine torque reserve may help to ensure that the driveline has sufficient torque to meet driver demand torque while cranking the engine.

The present description may provide several advantages. Specifically, the approach may help to ensure that an electric machine has sufficient torque to meet driver demand and start an engine. Further, the approach may improve driveline efficiency by utilizing a greater portion of an electric machine's torque capacity. In addition, the approach may reduce an amount of energy consumed to start an engine.

The above advantages and other advantages, and features of the present description will be readily apparent from the following Detailed Description when taken alone or in connection with the accompanying drawings.

Figure 1:
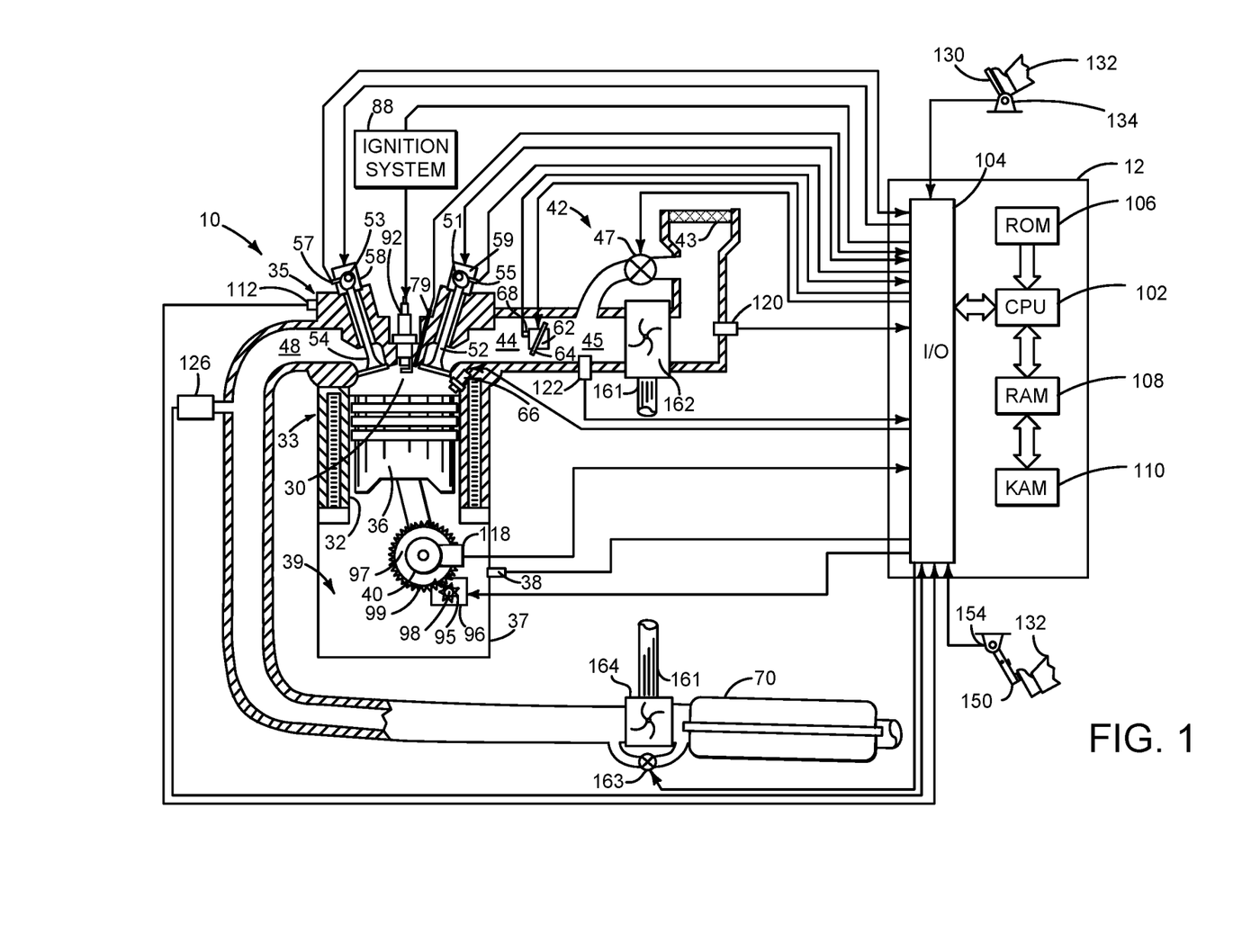
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99.

Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices. Controller 12 may reduce compression in cylinder 30 via opening compression relief valve 79 during engine starting to reduce engine cranking torque.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus.

Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
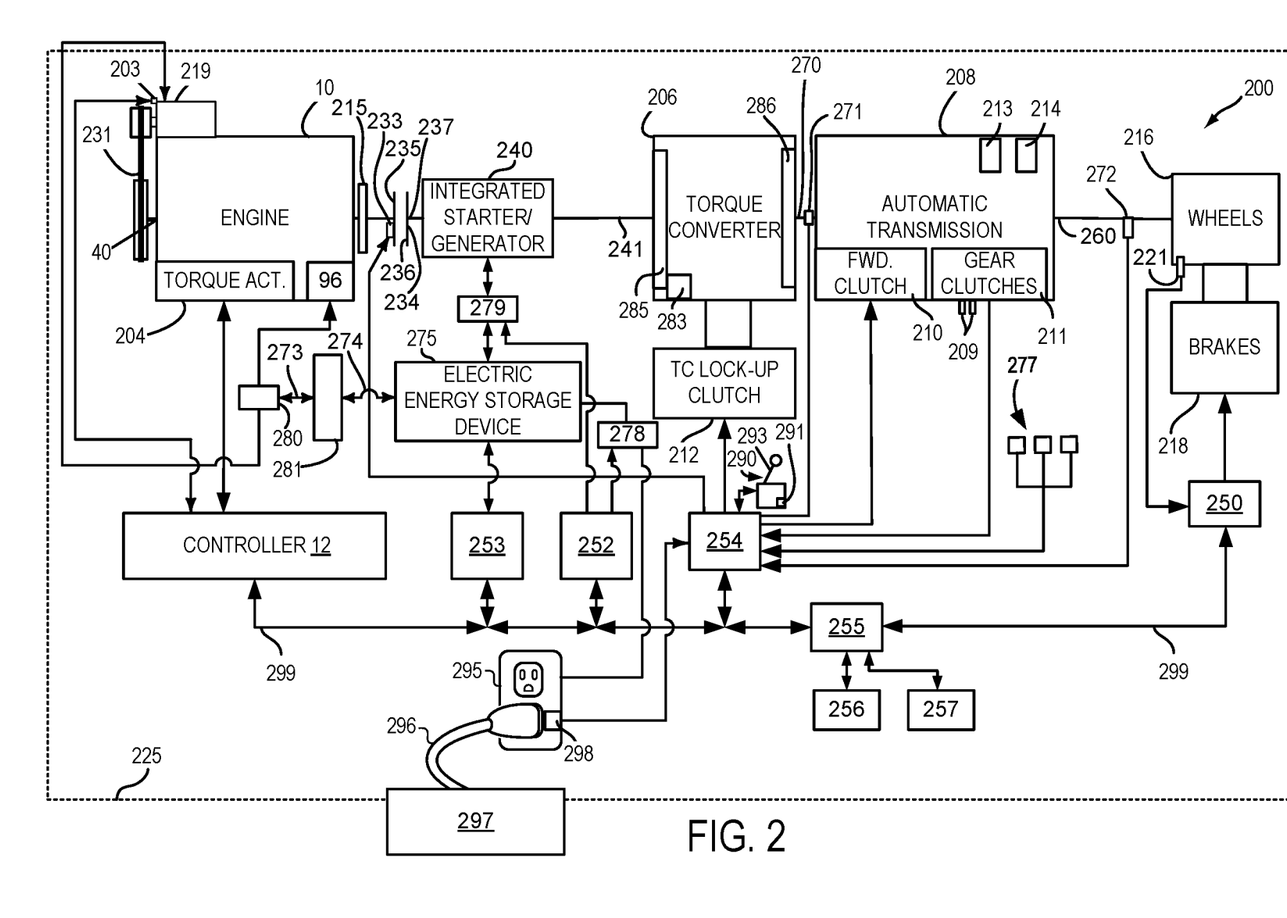
FIG. 2 shows a schematic diagram of an example vehicle driveline or powertrain including the internal combustion engine shown in FIG. 1.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers. In this example, powertrain 200 may be powered by engine 10 and electric machine 240.

In other examples, engine 10 may be omitted. Engine 10 may be started with an engine starting system shown in FIG. 1, via belt integrated starter/generator BIS G 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Bi-directional DC/DC converter 281 may transfer electrical energy from a high voltage buss 274 to a low voltage buss 273 or vice-versa. Low voltage battery 280 is electrically directly coupled to low voltage buss 273. Low voltage bus 273 may be comprised of one or more electrical conductors. Electric energy storage device 275 is electrically coupled to high voltage buss 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Inverter 278 is shown electrically coupled to electric energy storage device 275 and electrical output receptacle 295. Inverter 278 may convert DC power to AC power for operating external electric power consumer 297 (e.g., hand tools, entertainment systems, lighting, pumps, etc.). Inverter 278 may convert electric power from low voltage battery 280, electric power from electric energy storage device 275, or electric power from ISG 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors.

If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

The system of FIGS. 1 and 2 provides for a vehicle system, comprising: an internal combustion engine; an electric machine; a driveline disconnect clutch configured to selectively couple the engine to the electric machine; and a controller including executable instructions stored in non-transitory memory that cause the controller to determine a level of engine starting urgency, adjust operating states of one or more actuators responsive to the level of engine starting urgency, and start the engine responsive to the level of engine starting urgency, where the level of engine starting urgency is one of a plurality of engine starting urgency levels, and where at least one level of the plurality of engine starting urgency levels is determined according to an estimate of a capacity of the electric machine to meet a driver demand torque for a predetermined amount of time. The vehicle system further comprises additional executable instructions to determine the level of start urgency in response to an originator of a signal that an engine start is based on. The vehicle system includes where the level of start urgency is a first level when the originator of the signal is a human. The vehicle system includes where the level of start urgency is a second level when the originator of the signal is a system component, and where the first level has a higher priority than the second level. The vehicle system includes where the plurality of start urgency levels include a high urgency, a medium urgency, and a low urgency. The vehicle system further comprises additional instructions to adjust engine poppet valve lift and a state of a compression relief valve in response to the level of start urgency. The vehicle system further comprises additional instructions to adjust a torque capacity of the driveline disconnect clutch in response to the level of start urgency.

Referring now to FIG. 3, plots of two example engine starting sequences are shown. The engine starting sequences that are shown in FIG. 3 may be provided via the system of FIGS. 1 and 2 in cooperation with the methods of FIGS. 4 and 5. The vertical lines at times t0-t11 represent times of interest during the engine starting sequences. The five plots shown in FIG. 3 are aligned in time. The double SS marks along the horizontal axis of each plot represent a break in time and the duration of the break in time may be long or short.

The first plot from the top of FIG. 3 is a plot of engine starting urgency state versus time. The vertical axis represents the engine starting urgency state and the engine starting urgency may be low, medium (med.), or high. Trace 302 represents the engine starting urgency. The horizontal axis represents time and time increases from the left side of the plot to the right side of the plot.

The second plot from the top of FIG. 3 is a plot of torque versus time. The vertical axis represents torque and the value of torque increases in the direction of the vertical axis arrow. Trace 304 represents the driver demand torque. The horizontal axis represents time and time increases from the left side of the plot to the right side of the plot. Horizontal line 352 represents a torque capacity of the ISG minus the torque reserve of the ISG, which is a dynamic threshold for determining whether or not to automatically start the engine. The horizontal axis represents time and time increases from the left side of the plot to the right side of the plot.

The third plot from the top of FIG. 3 is a plot of expansion combustion torque versus time. The vertical axis represents expansion combustion torque and the amount of expansion combustion torque increases in the direction of the vertical axis arrow. Line 306 represents the amount of expansion combustion torque that is provided via the engine. The horizontal axis represents time and time increases from the left side of the plot to the right side of the plot. Horizontal line 352 represents a maximum amount of expansion combustion torque that may be generated based on the engine's most recent stopped position (e.g., the position of the engine when the engine is not rotating). The expansion combustion torque is a torque that may be provided via a first combustion event since a most recent engine stop in a cylinder that is stopped in the cylinder's expansion stroke for the engine's most recent stop.

The fourth plot from the top of FIG. 3 is a plot of compression combustion torque versus time. The vertical axis represents compression combustion torque and the amount of compression combustion torque increases in the direction of the vertical axis arrow. Line 306 represents the amount of compression combustion torque that is provided via the engine. The horizontal axis represents time and time increases from the left side of the plot to the right side of the plot. Horizontal line 354 represents a maximum amount of compression combustion torque that may be generated based on the engine's most recent stopped position (e.g., the position of the engine when the engine is not rotating). The compression combustion torque is a torque that may be provided via a first combustion event since a most recent engine stop in a cylinder that is stopped in the cylinder's compression stroke for the engine's most recent stop.

The fifth plot from the top of FIG. 3 is a plot of an estimated total amount of torque to crank the engine during starting. The estimated total amount of torque to crank the engine (e.g., an integrated amount of torque to crank the engine during engine starting) is based on the engine stop position. The vertical axis represents the estimated total amount of torque to crank the engine during engine starting and the estimated total amount of torque increases in the direction of the vertical axis arrow. Line 310 represents an estimated total amount of torque to crank the engine during engine starting. The horizontal axis represents time and time increases from the left side of the plot to the right side of the plot.

At time t0, the engine is stopped (not shown) and the vehicle is being propelled via the ISG. The driver demand torque is low and the amount of expansion combustion torque capacity for the engine is at a lower level based on the engine stop position. The compression combustion torque capacity for the engine is also at a lower level based on the engine stop position. The estimated amount of torque to crank the engine is at a lower level.

At time t1, a system induced engine start request is asserted (not shown) and a low engine start urgency determined to be present. The lower engine start urgency is based on the constant lower level driver demand torque and the engine start being originated by the vehicle system (e.g., an engine start may be requested in response to a low state of battery charge). The driver demand torque is well below threshold 350 so the engine start request does not originate from the human driver. The engine is started with a low amount of expansion combustion torque and a low amount of compression combustion torque. The estimated total amount of torque to crank the engine is at a lower level. The engine is started via rotating the engine via the ISG from time t1 to the break in the engine starting sequence. The engine is started with a small amount of expansion combustion torque and a small amount of compression combustion torque so that engine noise and vibration may be reduced.

At time t10, the engine is stopped (not shown) and the vehicle is being propelled via the ISG. The driver demand torque is low and it is increasing. The amount of expansion combustion torque capacity for the engine is at a medium level based on the engine stop position. The compression combustion torque capacity for the engine is at a lower level based on the engine stop position. The estimated amount of torque to crank the engine is at a middle level.

At time t11, an engine start request is asserted (not shown) in response to driver demand torque exceeding threshold 350. The engine start urgency is estimated to be a high level based on the engine start being requested in response to the driver demand exceeding threshold 350 and the expectation that the ISG has insufficient torque to start the engine and provide the requested driver demand torque at a predetermined time in the future (e.g., 0.5 seconds after time t11). The engine is started with expansion combustion torque being equal to the expansion combustion torque maximum level. This level of expansion combustion torque may be achieved via adjusting valve timing/lift, fuel injection amount, and spark timing relative to fuel injection timing. The engine is started with compression combustion torque being equal to the compression combustion torque maximum level. This level of compression combustion torque may be achieved via adjusting valve timing/lift, fuel injection amount, and spark timing relative to fuel injection timing. The total torque to crank the engine remains unchanged. Thus, the amount of expansion combustion torque at time t11 is increased as compared to the expansion combustion torque at time t1 so that the engine starting duration may be reduced based on the higher urgency of the requested engine start. In addition, the amount of compression combustion torque at time t11 is adjusted to the maximum level (e.g., the level indicated at line 354) to reduce engine starting time.

In this way, the amounts of expansion combustion torque and compression combustion torque may be adjusted according to the engine starting urgency level. The engine start urgency level may be determined by the origin of signal that the engine start request is based on. For example, since the engine start at time t1 was based on a system signal that is based on a state of charge (SOC) level that is generated via the vehicle system, the engine start urgency is determined to be low. Conversely, the engine start at time t11 was based on a driver demand torque that is generated via a human driver depressing an accelerator pedal and the capacity of the ISG to meet driver demand torque a predetermined amount of time in the future after time t11, the engine start urgency is determined to be high.

Referring now to FIG. 4, a method for determining a torque reserve for an electric machine is shown. The torque reserve is an amount of torque that may be expected to start an internal combustion engine. At least portions of method 400 may be implemented as executable controller instructions stored in non-transitory memory. Method 400 may operate in cooperation with the system of FIGS. 1 and 2 along with method 500. Additionally, portions of method 400 may be actions taken in the physical world to transform an operating state of an actuator or device. The method of FIG. 4 may be incorporated into the system of FIGS. 1 and 2 as executable instructions stored in non-transitory memory.

At 402, method 400 judges if the engine is stopped (e.g., not rotating). Method 400 may judge that the engine is stopped when a pulse train is not output from the engine position sensor. If method 400 judges that the engine is stopped, the answer is yes and method 400 proceeds to 404, 408, 410, and 430. Otherwise, the answer is no and method 400 proceeds to 450.

At 450, method 400 delivers a driver demand torque via the engine and the ISG. In one example, method 400 determines driver demand torque according to a position of an accelerator pedal. Method 400 commands the engine to provide a percentage of the driver demand torque.

Method 400 also commands the ISG to output a percentage of the driver demand torque. Alternatively, the ISG may be commanded to consume torque from the driveline and charge a battery or other electric energy storage device. Method 400 proceeds to exit.

At 404, method 400 determines if expansion combustion is possible for a cylinder of the engine that is on an expansion stroke when the engine is stopped. Expansion combustion is combustion that is initiated in a cylinder that is on an expansion stroke when the engine is not rotating. Combustion may be initiated via injecting fuel to the cylinder that is on its expansion stroke and combusting an air-fuel mixture that is formed in the cylinder via a spark generated via a spark plug. The expansion combustion may help to generate torque to rotate the engine crankshaft, thereby reducing engine cranking torque and cranking time (e.g., an amount of time that the engine's crankshaft is rotated via an electric machine under power of the electric machine).

In one example, method 400 references a table or function that outputs a value of one or true if expansion combustion is possible at the present engine operating conditions. The table or function outputs a value of zero or false if expansion combustion is not possible at the present engine operating conditions. The table or function may be referenced by engine stopping position (e.g., crankshaft angle), present engine fuel rail pressure, present engine temperature, and present barometric pressure. The expansion combustion possibility may be determined via the following equation:

$$\text{Exp\_comb} = f(\text{eng\_}p, \text{eng\_}t, \text{bp}, \text{Frp})$$

where Exp_comb is a variable that represents a reduction in a cranking torque requirement due to expansion combustion within the engine, f is a function that returns a value of the reduction in the cranking torque requirement, eng_p is the engine stop position in crankshaft degrees, eng_t is the present engine temperature, bp is the present barometric pressure, and Frp is the present fuel rail pressure. A value of zero for Exp_comb indicates that there is no impact from expansion combustion.

Values in the table or function may be empirically determined via attempting expansion combustion at a variety of engine stopping positions, at a variety of barometric pressures, at a variety of fuel rail pressures, and at a variety of engine temperatures. Of course, fuel injection timing and spark timing for the engine at these varying conditions may be adjusted while attempting to start the engine via expansion combustion. Method 400 proceeds to 406.

At 406, method 400 determines an effective amount of torque or resistance to motion that the cylinder on the expansion stroke may provide. In one example, torque generated at 404 during the various engine starting conditions may be recorded and stored to memory. Method 400 may look-up a torque value that is stored in controller memory using the engine position, fuel injection timing, ignition timing, barometric pressure, fuel rail pressure, and engine temperature applied at 404 to determine an effective amount of torque or resistance that may be expected to be generated via the expansion stroke combustion.

In one example, method 400 references a table or function that outputs a value of torque or resistance that may be expected from expansion combustion. The table or function may be referenced by engine stopping position (e.g., crankshaft angle), present engine fuel rail pressure, present engine temperature, and present barometric pressure. The expansion combustion torque or resistance may be determined via the following equation:

$$\text{Exp\_c\_tor} = fn(\text{eng\_}p, \text{eng\_}t, \text{bp}, \text{Frp}, \text{spk\_}t))$$

where Exp_c_tor is a variable that represents the reduction in required cranking torque due to the ability to achieve helpful expansion combustion torque for the cylinder(s) that are stopped on their expansion stroke, fn is a function that returns real number value of engine torque that may be generated via expansion combustion from the engine cylinder that is stopped on its expansion stroke, and spk_t is engine spark timing. This value of Exp_c_tor may be zero if expansion combustion is not possible based on the engine conditions. Method 400 proceeds to 420.

At 408, method 400 determines if compression combustion is possible for a cylinder of the engine that is on an expansion stroke when the engine is stopped. Compression combustion is combustion that is initiated in a cylinder when the engine is rotating after the engine had been stopped rotating on its compression stroke, possibly starting from a position after intake valve close. Combustion may be initiated via injecting fuel to the cylinder that is on its compression stroke and combusting an air-fuel mixture that is formed in the cylinder via a spark generated via a spark plug after the engine has started rotating so that the resulting torque from cylinder pressure helps the engine rotate forward. The compression combustion helps to generate torque to rotate the engine crankshaft, thereby reducing the required external engine cranking torque and/or cranking time (e.g., an amount of time that the engine's crankshaft is rotated via an electric machine under power of the electric machine) to meet the same engine start performance In one example, method 400 references a table or function that outputs a value of one or true if compression combustion is possible at the present engine operating conditions. The table or function outputs a value of zero or false if compression combustion is not possible at the present engine operating conditions. The table or function may be referenced by engine stopping position (e.g., crankshaft angle), present engine fuel rail pressure, present engine temperature, and present barometric pressure. The compression combustion possibility may be determined via the following equation:

$$\text{Comp\_c\_tor} = fx(\text{eng\_}p, \text{eng\_}t, \text{bp}, \text{Frp})$$

where Comp_c_tor is a variable that represents the reduction in required cranking torque due to the ability to achieve combustion and whether or not compression combustion is possible for a cylinder that is stopped on its compression stroke, fx is a function that returns a value that indicates the possibility of compression combustion for an engine cylinder, eng_p is the engine stop position in crankshaft degrees, eng_t is the present engine temperature, bp is the present barometric pressure, and Frp is the present fuel rail pressure. The function fx returns a value of zero when compression combustion is not possible at the start.

Values in the table or function may be empirically determined via attempting compression combustion at a variety of engine stopping positions, at a variety of barometric pressures, at a variety of fuel rail pressures, and at a variety of engine temperatures. Of course, fuel injection timing and spark timing for the engine at these varying conditions may be adjusted while attempting to start the engine via compression combustion. Method 400 proceeds to 420.

At 410, method 400 estimates the amount of torque it will take to rotate the engine crankshaft via the ISG at a speed for a high urgency engine start. In one example, method 400 may estimate an amount of torque to rotate the engine crankshaft via a table or function. The table or function may hold empirically determined ISG torque values for rotating the engine at a speed for a high urgency engine start. The amount of torque to rotate the engine crankshaft at a speed for a high urgency engine start may be determined via the following equation:

$$\text{Eng\_crk\_}T\text{\_high} = fa(\text{eng\_}p, \text{eng\_}t, \text{bp}, \text{Frp}, \text{crp})$$

where eng_crk_T_high is engine cranking torque for a high engine starting urgency level, fa is a function that returns an engine cranking torque for an engine start that its highly urgent, eng_p is the engine stop position in crankshaft degrees, eng_t is the present engine temperature, bp is the present barometric pressure, Frp is the present fuel rail pressure, and crp is an operating state of a compression relief valve, if present. Method 400 proceeds to 420.

At 420, method 400 determines a maximum torque for the ISG to rotate the engine during a high urgency engine start based on the engine position, temperature, barometric pressure ability to use a compression relief device. In one example, method 400 may determine the maximum torque for the ISG according to the following equation:

$$\text{Em\_tr\_high} = \text{Eng\_crk\_}T\text{\_high}(\text{eng\_}p, \text{eng\_}t, \text{bp}, \text{Frp}, \text{crp})$$

$$-\text{Exp\_c\_tor}(\text{eng\_}p, \text{eng\_}t, \text{bp}, \text{Frp}, \text{spk\_}t)$$

$$-\text{Comp}\_c\_\text{tor}(\text{eng}\_p,\text{eng}\_t,\text{bp},\text{Frp})$$

where Em_tr_high is the maximum electric machine torque to crank the engine, Eng_crk_T_high is the engine cranking torque for high engine starting urgency (e.g. torque required to rotate engine 200 crank degrees in less than 250 ms) in the absence of combustion in cylinders stopped on the expansion and compression strokes, Exp_comb_Tor is a function that outputs the reduction in cranking torque required based on the ability to achieve the expansion combustion, crk_pos is engine crankshaft position, afr is air-fuel ratio for compression or expansion combustion, spk_t is spark timing for expansion or compression combustion, and C_comb_Tor is a function that outputs torque generated via compression combustion. Method 400 proceeds to 422.

At 430, method 400 determines a maximum amount of ISG torque that is desired for a high urgency engine start after combustion has been initiated in the engine. The maximum amount of ISG torque that is desired for the high urgency engine start may be applied during engine run-up (e.g., the time beginning after a predetermined total number of combustion events in the engine since the most recent engine stop up to a time when the engine reaches a predetermined speed, such as synchronous speed with the ISG). In one example, the maximum ISG torque that is desired may be determined via the following equation:

$$\text{Run}\_\text{hi}\_\text{Tor}=fc(\text{DISG}\_n,\text{Drv}\_\text{mod},\text{Gear})$$

where Run_hi_torque is the maximum ISG torque that is available during engine run-up to a predetermined speed, fc is a function that returns the maximum ISG torque that is available during engine run-up to the predetermined speed, ISG_n is the present ISG rotational speed, Drv_mod is the present driver selected driveline mode, and Gear is the presently engaged transmission gear. Method 400 proceeds to 422.

At 422, method 400 determines the maximum ISG torque during engine cranking and engine run-up. Method 400 may determine the maximum ISG torque during engine cranking and engine run-up via the following equation:

$$\text{Max}\_\text{crk}\_\text{run}=\max(\text{Run}\_\text{hi}\_\text{Tor},\text{Em}\_\text{tr}\_\text{high})$$

where Max_crk_run is a maximum ISG torque during engine cranking and run-up, max is a function that returns a greater of argument 1 and argument 2 (e.g., max(argument 1, argument 2)), Run_hi_Tor is the maximum ISG torque during run-up, and Em_tr_high is the maximum ISG torque during engine cranking. Method 400 proceeds to 424.

At 424, method 400 determines a torque reserve for the ISG. Method 400 adds a predetermined amount of torque (e.g., an offset) to the Max_crk_run torque that is determined at 422 to determine the ISG torque reserve. The ISG torque reserve may be described via the following equation:

$$\text{ISG}\_T\_\text{res}=\text{Max}\_\text{crk}\_\text{run}+\text{offset}\_\text{crk}\_\text{run}$$

where ISG_T_res is a ISG torque reserve for starting the engine, Max_crk_run is the maximum ISG torque as determined at 422, and offset_crk_run is a predetermined offset torque value (e.g., 30 Newton-meters) to ensure that the engine may be accelerated at a desired rate during engine cranking and run-up. Method 400 proceeds to exit after the ISG torque reserve is determined.

Referring now to FIG. 5, a method for applying the torque reserve for the electric machine (e.g., ISG 240) and starting an engine is shown. At least portions of method 500 may be implemented as executable controller instructions stored in non-transitory memory. Method 500 may operate in cooperation with the system of FIGS. 1 and 2 along with method 400. Additionally, portions of method 500 may be actions taken in the physical world to transform an operating state of an actuator or device. The method of FIG. 5 may be incorporated into the system of FIGS. 1 and 2 as executable instructions stored in non-transitory memory.

At 502, method 500 judges if driver demand torque is equal to or exceeds the torque capacity of the ISG minus the ISG torque reserve that is determined at 424. The ISG torque capacity is the maximum amount of torque that the ISG may output at the present ISG rotational speed. If method 500 judges that the driver demand torque exceeds the torque capacity of the ISG minus the ISG torque reserve, the answer is yes and method 500 proceeds to 504. Otherwise, the answer is no and method 500 returns to 502.

At 504, method 500 requests an engine start via cranking the engine with the ISG. Method 500 proceeds to 506.

At 506, method 500 judges whether or not the ISG may meet the predicted driver demand torque at a predetermined amount of time in the future from the present time while cranking and running up the engine. In one example, method predicts the driver demand a predetermined amount of time in the future via extrapolating the present driver demand torque and a past driver demand torque. For example, method 500 determines the rate if change of the driver demand torque via the following equation:

$$\text{DD}\_\text{slope}=(\text{DD}t2-\text{DD}t1)/(t2-t1)$$

where DD_slope is the driver demand torque slope or rate of change, DDt2 is driver demand torque at the present time, DDt1 is driver demand torque at the last previous driver demand sample time, t2 is the present driver demand sample time, and t1 is the last previous driver demand sample time. After the driver demand slope is determined, driver demand may be extrapolated to a predetermined time in the future (e.g., 0.5 seconds from the present time) via the following equation:

$$\text{DD}\_\text{pre}=\text{DD}\_\text{present}+\text{DD}\_\text{slope}\cdot\text{DD}\_\text{ex}\_t$$

where DD_pre is the predicted driver demand torque, DD_present is the present driver demand torque, DD_slope is the rate of change in driver demand torque, and DD_ex_t is the amount of time in the future to extrapolate the driver demand torque. For example, if the present driver demand torque is 150 Newton-meters, the driver demand slope is 5 Newton-meters/second, and the amount of time to extrapolate driver demand in the future is 0.5 seconds, then the predicted driver demand torque=150+(5*0.5)=152.5.

The predicted driver demand torque may be added to the ISG torque reserve or the amount of torque to be supplied by the ISG to crank and run-up to determine if the ISG may meet the predicted driver demand torque at a predetermined amount of time in the future from the present time while cranking and running up the engine. For example, method 500 may judge that the ISG may provide the predicted driver demand torque and torque to crank and run-up the engine if DD_pre+ISG_T_res<ISG_T_cap, where ISG_T_cap is the ISG torque capacity at the present ISG speed. If method 500 judges that the ISG may meet the predicted driver demand torque at a predetermined amount of time in the future from the present time while cranking and running up the engine, then the answer is yes and method 500 proceeds to 550 and 560. Method 500 may judge that the engine starting urgency is not a high urgency when the ISG may meet the predicted driver demand torque at the predetermined amount of time in the future while cranking the engine. Otherwise, the answer is no and method 500 proceeds to 508. Method 500 may judge that the engine starting urgency is a high urgency when the ISG may not meet the predicted driver demand torque at the predetermined amount of time in the future while cranking the engine.

At 508, method 500 cranks the engine (e.g., rotates the engine at a predetermined cranking speed, such as 250 RPM or ISG speed) applying expansion combustion, compression combustion, and poppet valve lift and timing for maximum engine performance. Method 500 also adjusts the torque capacity (e.g., an amount of torque that the driveline disconnect clutch may transfer) of the driveline disconnect clutch to equal the ISG torque capacity. Thus, the torque capacity of the driveline disconnect clutch may be adjusted in response to an amount of work generated via expansion combustion, behavior (e.g., operating/not operating) of compression relief valves and poppet valves during engine cranking, position at which the engine stops rotating, engine coolant temperature, engine oil temperature, and barometric pressure, all of which may be indicative of engine cranking torque. These adjustments allow the ISG and engine to respond to high urgency engine starting conditions. A higher urgency engine start may be an engine start that increases driveline noise and vibration, yet may deliver larger amounts of torque soon after an engine start request. Method 500 proceeds to 572.

At 550, method 500 determines an urgency level for the requested engine start. High urgency engine starts proceed to 508 from 506, so engine start requests that reach 550 and 560 may be low urgency or medium urgency engine starts. In one example, of the originator of a signal that is a basis for the engine start request is a human operator, then the engine start urgency is medium urgency. However, if a system component is the originator of the signal that is the basis for the engine start request, then the engine start urgency may be determined to be lower urgency. Nevertheless, some vehicle devices that are the basis for the engine start request may be the basis for adjusting engine starting urgency to a medium level. For example, an engine exhaust system temperature monitor that is the basis for an engine start request may be deemed to warrant a low engine start urgency level. Conversely, a significant change in battery state of charge in a short time period may be deemed to warrant a medium engine start urgency level. Method 500 may adjust engine start urgency levels according to the originator of the engine start request as well as rates of change of vehicle operating parameters (e.g., battery state of charge). Method 500 determines the engine start urgency level and proceeds to 552.

At 552, method 500 determines a desired engine cranking performance. The desired engine cranking performance may be based on the engine starting urgency. For example, if the engine starting urgency is low, then the engine cranking performance may be set to a low level so that longer engine cranking times may be permitted. In addition, the engine cranking speed may be a function of the engine cranking performance level. If the engine cranking performance level is low, the engine may be rotated via the ISG at a lower speed (e.g., 250 RPM). If engine cranking performance is medium, the engine may be cranked up to engine idle speed, for example. If the engine starting urgency is medium, then the engine cranking performance may be set to a medium level so that shorter engine cranking times may be provided. Method 500 proceeds to 564 and 568.

At 560, method 500 determines if one or more cylinder compression relief valves are available or not available. A compression relief valve may not be available if the cylinder compression relief valve will not change state when it is commanded to do so. In addition, a compression relief valve may not be available if the engine does not include compression relief valves. The compression relief valves may be selectively opened during engine cranking to reduce engine cranking torque, if desired. Opening the compression relief valve may allow some air to escape from engine cylinders during engine cranking so that the engine may be cranked or rotated using less torque as compared to if the compression relief valve is held closed. Method 500 proceeds to 562 after determining the availability of the compression relief valves.

At 562, method 500 determines intake and exhaust poppet valve timing and lift for each combination of compression relief valve state and expansion combustion. In one example, the controller includes predetermined intake and exhaust poppet valve opening and closing timings as well as lift amounts for conditions when a compression relief valve is present and available and when expansion combustion is possible. The corresponding engine cranking torque for these conditions is also stored in controller memory.

Method 500 also includes predetermined intake and exhaust poppet valve opening and closing timings as well as lift amounts for conditions when a compression relief valve is not present and not available and when expansion combustion is possible. The corresponding engine cranking torque for these conditions is also stored in controller memory.

Method 500 also includes predetermined intake and exhaust poppet valve opening and closing timings as well as lift amounts for conditions when a compression relief valve is present and available and when expansion combustion is not possible. The corresponding engine cranking torque for these conditions is also stored in controller memory.

Method 500 also includes predetermined intake and exhaust poppet valve opening and closing timings as well as lift amounts for conditions when a compression relief valve is not present and not available and when expansion combustion is not possible. The corresponding engine cranking torque for these conditions is also stored in controller memory. Method 500 proceeds to 564.

At 564, method 500 selects an optimum combination of the compression relief valve activation/deactivation, expansion combustion activation/deactivation, and poppet valve timings/lift to minimize engine cranking torque energy. In one example, method selects the intake and exhaust poppet valve timing/lift with the lowest engine cranking torque that meets the present engine starting urgency, expansion combustion possibility determination (e.g., possible/not possible), and compression relief valve availability (e.g., available/not available). For example, if expansion combustion has been determined possible, the engine starting urgency is medium, and the compression relief valve is not available, then method 500 selects intake and exhaust poppet valve timing/lift values that provide the lowest engine cranking torque for these operating conditions. Likewise, if expansion combustion has been determined not possible, the engine starting urgency is low, and the compression relief valve is available, then method 500 selects intake and exhaust poppet valve timing/lift values that provide the lowest engine cranking torque for these operating conditions. Method 500 proceeds to 566.

At 566, method 500 estimates the engine torque contribution and/or resistance to the present engine cranking event. In one example, method 500 estimates an engine torque contribution to engine starting according to the present volume of the cylinder that is on its expansion stroke, engine temperature, and intake/exhaust poppet valve timing/lift. In one example, the present volume of the cylinder that is on its expansion stroke, engine temperature, and intake/exhaust poppet valve timing/lift reference a table or function that outputs a torque contribution value for the present engine cranking event. Values in the table or function may be empirically determined via starting the engine and monitoring engine torque at different operating conditions. Method 500 proceeds to 568.

At 568, method 500 determines the ISG torque for cranking the engine. In one example, method 500 may determine the ISG torque according to the present engine start urgency level. When engine starting urgency is medium level, method 400 may determine a maximum torque for the ISG according to the following equation:

$$ISG\_T = DD\_present + Eng\_crk\_T\_med(eng\_p, eng\_t, bp, Frp, crp)$$

$$-Exp\_c\_tor(eng\_p, eng\_t, bp, Frp, spk\_t)$$

$$-Comp\_c\_tor(eng\_p, eng\_t, bp, Frp)$$

where Eng_crk_t_med is torque to crank the engine at a speed that is suitable for a medium engine starting urgency level (e.g., rotating engine by 200 crank degrees in less than 300 ms), ISG_T is the ISG torque to rotate the engine crankshaft at the speed that is suitable for a medium engine starting urgency level and provide the driver demand torque. When engine starting urgency is low level, method 400 may determine a maximum torque for the ISG according to the following equation:

$$ISG\_T = DD\_present + Eng\_crk\_T\_low(eng\_p, eng\_t, bp, Frp, crp)$$

$$-Exp\_c\_tor(eng\_p, eng\_t, bp, Frp, spk\_t)$$

$$-Comp\_(c\_tor(eng\_p, eng\_t, bp, Frp))$$

where Eng_crk_T_low is torque to crank the engine at a speed that is suitable for a low engine starting urgency level (e.g., 250 RPM), ISG_T is the ISG torque to rotate the engine crankshaft at the speed that is suitable for a low engine starting urgency level and provide the driver demand torque. Method 400 proceeds to 570.

At 570, method 500 cranks the engine via the ISG according to the ISG torque determined at 568. Method 500 also adjusts intake and exhaust poppet valve timing, compression relief valve state, and expansion combustion activation/deactivation to minimize engine cranking torque energy and provide engine starting with the determined urgency. For example, if method 500 judged that expansion combustion has been determined possible, the engine starting urgency is medium, and the compression relief valve is not available, then method 500 selects intake and exhaust poppet valve timing/lift values that provide the lowest engine cranking torque for these operating conditions while rotating the engine at the ISG torque determined at 568. Method 500 also adjusts the torque capacity of the driveline disconnect clutch to a torque output of the ISG minus driver demand torque via adjusting a pressure that is applied to a driveline disconnect clutch. Thus, the torque capacity of the driveline disconnect clutch may be adjusted in response to an amount of work generated via expansion combustion, behavior (e.g., operating/not operating) of compression relief valves and poppet valves during engine cranking, position at which the engine stops rotating, engine coolant temperature, engine oil temperature, and barometric pressure, all of which may be indicative of engine cranking torque. Method 500 proceeds to 572.

At 572, method 500 performs the remainder of the engine start and run-up according to the engine start urgency level. For example, method 500 may adjust the rate of engine acceleration from cranking speed to ISG speed according to the engine starting urgency. In one example, method 500 may accelerate the engine from cranking speed to ISG speed at a rate of X RPM/second when engine starting urgency is high. Method may accelerate the engine from cranking speed to ISG speed at a rate of Y RPM/second when engine starting urgency is medium. Method may accelerate the engine from cranking speed to ISG speed at a rate of Z RPM/second, where X>Y>Z. Method 500 proceeds to exit.

In this way, method 500 may start the engine according to an engine starting urgency level. In addition, method 500 starts or does not start an engine according to a dynamically changing threshold.

Thus, the methods of FIGS. 4 and 5 provide for a method for operating a vehicle, comprising: dynamically adjusting a torque reserve of an electric machine for engine starting according to an engine stopping position and an expected amount of reduction in required cranking torque due to the torque and work generated from combustion in cylinders initially positioned on expansion and compression strokes in an engine; and starting the engine via the electric machine in response to driver demand torque being greater than or equal to an available torque of the electric machine minus the torque reserve of the electric machine.

The method includes where the expected amount of torque reduction due to expansion stroke combustion in the engine is zero when expansion stroke combustion cannot be supported via the engine. The method includes where dynamically adjusting the torque reserve of the electric machine includes decreasing the torque reserve of the electric machine as the expected amount of torque and work generated via expansion stroke combustion increases. The method includes where dynamically adjusting the torque reserve of the electric machine includes increasing the torque reserve of the electric machine as the expected amount of torque and work generated via expansion stroke combustion decreases. The method further comprises decreasing the torque reserve as an expected amount of torque and work generated from combustion in the first compression stroke since a most recent engine stop increases. The method further comprises adjusting a torque capacity of a driveline disconnect clutch in coordination with the torque reserve of the electric machine in response to starting the engine, adjusted based on the torque and work generated from combustion in cylinders initially on (e.g., when the engine is not rotating just before starting the engine) the expansion and compression strokes. The method includes where starting the engine includes at least partially closing the driveline disconnect clutch.

The method of FIGS. 4 and 5 also provides for a vehicle operating method, comprising: predicting a driver demand torque from a present time to a predetermined future time; selecting a first level of engine starting urgency in response to inability of an electric machine to provide the predicted driver demand torque at the predetermined future time; selecting a second level of engine starting urgency in response to the electric machine being able to provide the predicted driver demand torque at the predetermined future time; selecting a third level of engine starting urgency in response to a system requested engine start and the electric machine being able to provide the predicted driver demand torque. The method further comprises determining a torque reserve of an electric machine for starting an engine. The method further comprises starting the engine in response to a driver demand torque being greater than or equal to a torque capacity of the electric machine minus a torque reserve of the electric machine. The method further comprises adjusting a state of a compression relief valve in response to the level of engine starting urgency. The method further comprises adjusting lift of a poppet valve in response to the level of engine starting urgency. The method further comprises adjusting a torque capacity of a driveline disconnect clutch in response to at least one of the level of engine starting urgency, an amount of work generated via expansion combustion, behavior of compression relief valves or poppet valves during engine cranking, a position that the engine stops rotating, engine coolant temperature, engine oil temperature, and barometric pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
dynamically adjusting a torque reserve of an electric machine for engine starting according to an engine stopping position and an expected amount of reduction in required cranking torque due to the torque and work generated from combustion in cylinders initially positioned on expansion and compression strokes in an engine;
starting the engine via the electric machine in response to driver demand torque being greater than or equal to an available torque of the electric machine minus the torque reserve of the electric machine; and
adjusting a torque capacity of a driveline disconnect clutch in coordination with the torque reserve of the electric machine in response to starting the engine, the adjusting of the torque capacity of the driveline disconnect clutch based on the torque and work generated from combustion in cylinders initially positioned on the expansion and compression strokes.

2. The method of claim 1, where the expected amount of torque reduction due to expansion stroke combustion in the engine is zero when expansion stroke combustion cannot be supported via the engine.

3. The method of claim 1, where dynamically adjusting the torque reserve of the electric machine includes decreasing the torque reserve of the electric machine as the expected amount of torque and work generated via expansion stroke combustion increases.

4. The method of claim 3, where dynamically adjusting the torque reserve of the electric machine includes increasing the torque reserve of the electric machine as the expected amount of torque and work generated via expansion stroke combustion decreases.

5. The method of claim 1, further comprising decreasing the torque reserve as an expected amount of torque and work generated from combustion in the first compression stroke since a most recent engine stop increases.

6. The method of claim 1, where starting the engine includes at least partially closing the driveline disconnect clutch.

7. A vehicle operating method, comprising:
predicting a driver demand torque from a present time to a predetermined future time;
selecting a first engine starting level in response to inability of an electric machine to provide the predicted driver demand torque at the predetermined future time;
selecting a second engine starting level in response to the electric machine being able to provide the predicted driver demand torque at the predetermined future time;
selecting a third engine starting level in response to a system requested engine start and the electric machine being able to provide the predicted driver demand torque;
adjusting an actuator according to selecting the first engine starting level, selecting the second engine starting level, or selecting the third engine starting level;
decreasing a torque reserve of an electric machine as an expected amount of torque and work generated from combustion in a first compression stroke since a most recent engine stop increases; and
adjusting a torque capacity of a driveline disconnect clutch in response to the selected engine starting level, an amount of work generated via expansion combustion, behavior of compression relief valves or poppet valves during engine cranking, a position that the engine stops rotating, engine coolant temperature, engine oil temperature, and barometric pressure.

8. The method of claim 7, where the electric machine is an electric machine that provides propulsive effort to a vehicle.

9. The method of claim 8, further comprising starting the engine in response to a driver demand torque being greater than or equal to a torque capacity of the electric machine minus a torque reserve of the electric machine.

10. The method of claim 7, where the actuator is a compression relief valve.

11. The method of claim 7, where the actuator is a poppet valve actuator.

* * * * *